W. H. KENERSON.
HYDROSTATIC WEIGHING MACHINE.
APPLICATION FILED SEPT. 29, 1909.
1,023,154. Patented Apr. 16, 1912.
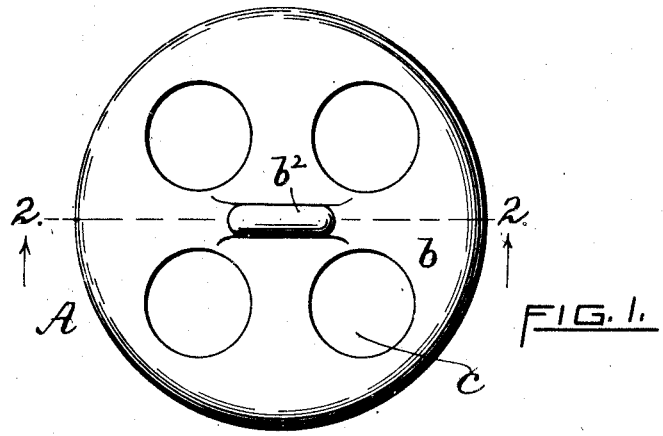
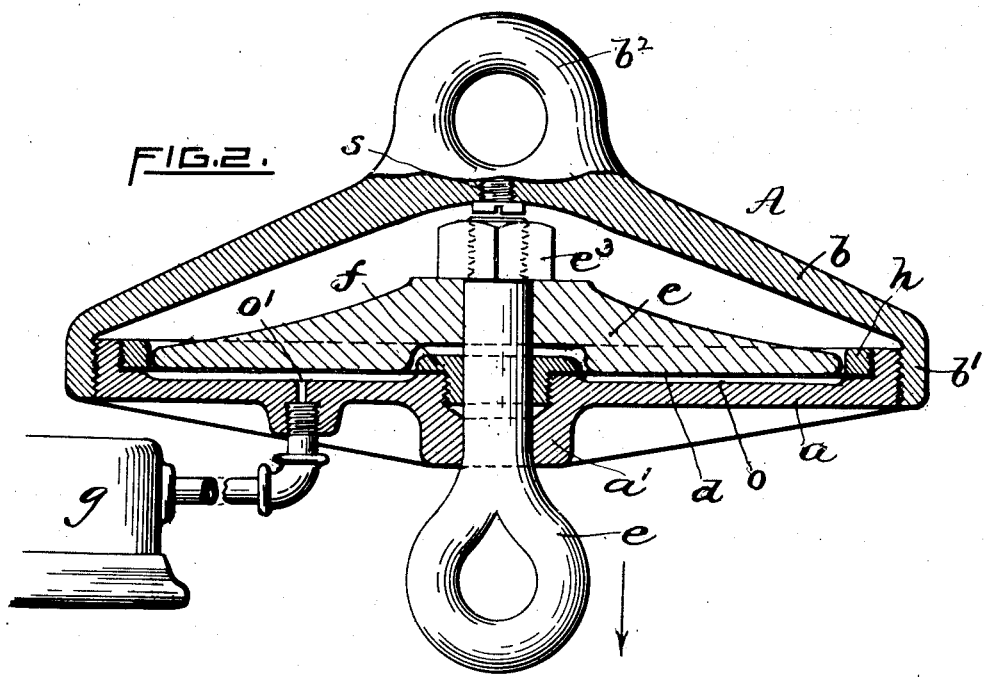
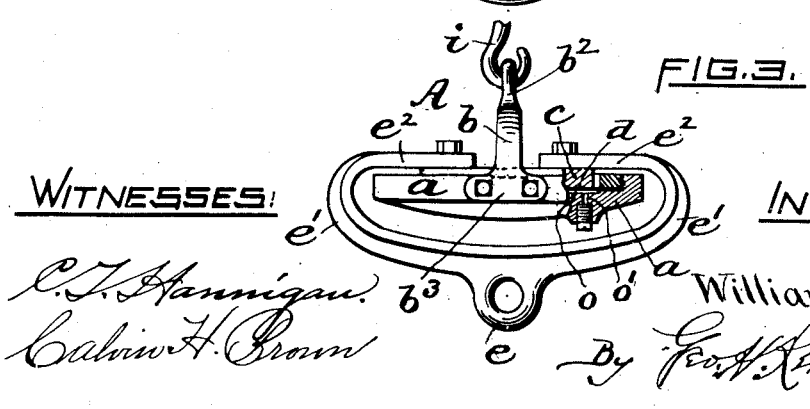
WITNESSES: INVENTOR:
William H. Kenerson

UNITED STATES PATENT OFFICE.

WILLIAM H. KENERSON, OF PROVIDENCE, RHODE ISLAND.

HYDROSTATIC WEIGHING-MACHINE.

1,023,154. Specification of Letters Patent. Patented Apr. 16, 1912.

Application filed September 29, 1909. Serial No. 520,079.

*To all whom it may concern:*

Be it known that I, WILLIAM H. KENERSON, a citizen of the United States, residing at Providence, in the county of Providence and State of Rhode Island, have invented certain new and useful Improvements in Hydrostatic Weighing-Machines, of which the following is a specification.

The device forming the subject of this application for Letters Patent relates to improvements in weighing-machines of the hydrostatic type, and it consists in certain novel features of construction and combination, as hereinafter fully set forth and claimed.

In hydrostatic weighing-machines, as usually devised, a cylinder is employed in which a piston is movably mounted, a fluid, as oil, being confined between the adjacent lower ends of the cylinder and piston, the latter being directly supported by and upon the oil. A suitably graduated gage is or may be connected with the oil-chamber to indicate the downward force or pressure of the object being weighed.

There are objections or disadvantages to the use of weighing-machines of the class referred to; that is to say, the piston must necessarily be fitted so as to prevent leakage or the passage of oil from the chamber past the sides of the piston when pressure is applied, as in weighing objects, thereby producing a considerable degree of friction, which materially affects the accuracy of the result or gage reading. Such former construction also precludes the use of the machine for properly weighing relatively light articles or bodies.

The object I have in view is to produce a hydrostatic weighing-machine or contrivance that is simple in its construction; not liable to get out of order or become inoperative; and comparatively inexpensive to manufacture.

The device is wholly frictionless, and is adapted to and capable of weighing objects varying greatly in weight with a much greater degree of accuracy, as compared with analogous weighing-machines heretofore devised. Or, in other words, in former devices of this general type fluid pressure plays an important part, but in my improved weighing apparatus the fluid pressure alone sustains the entire load being weighed.

In the accompanying sheet of drawings, Figure 1 represents a top plan view of a weighing-apparatus embodying my invention. Fig. 2 is a cross-sectional view taken on line 2 2 of Fig. 1, in enlarged scale; and Fig. 3 is a side elevation, in partial section, showing in reduced scale a modified construction of the device.

My improved hydrostatic weighing-machine, indicated by A in the drawings, comprises essentially the relatively stationary base element or member $a$, provided with the very shallow oil-chamber $o$ having a relatively large area, the very thin rigidly held flexible diaphragm $d$ adapted to press directly upon the surface of the oil in said chamber, and the upper ring or member $b$, combined with the mushroom-shaped top plate or disk $c$ forming a support or backing member for the diaphragm, and means connected with the disk arranged to temporarily hold or suspend the object while it is being weighed.

The base $a$ is substantially flat, its outer periphery or rim having the rim or bail member $b$ screwed or otherwise secured thereto. A shallow annular recess is formed in the upper face of the base, the same being surmounted by an extremely thin, slightly flexible, flat diaphragm $d$ of metal, thereby producing a chamber, $o$, having a relatively large area adapted to be filled with a fluid, as oil or glycerin. The base member $a$ has a central hub, $a^1$, having a transverse opening for the free passage of the shank of an eye-bolt, $e$, all as clearly represented in Fig. 2. The diaphragm, which in this case has a central opening therein, rests upon the inner and outer supporting surfaces or seats formed in the base, and is soldered or otherwise secured thereto, thus rendering the chamber $o$ air and fluid-tight. A central gland-like nut, $f$, and an outer annular nut, $h$, may also be employed, the same being screwed snugly down upon the adjacent portions of the diaphragm and soldered thereto, if desired. The chamber $o$ is provided with a suitably located passage or duct, $o^1$, adapted to be connected with a pressure-indicating gage, as $g$, the latter, when the machine is in use, being employed for indicating the weight or pressure upon the fluid in the chamber in a well-known manner. The said bail member $b$ may have any suitable form. As represented in Fig. 2, its lower portion terminates in an internally screw-threaded annular rim or flange, $b^1$, screwed to the element $a$, as before stated. The upper end portion of member $b$ has a central eye, $b^2$, arranged to receive a hook or other analogous means adapted to suspend the weighing-machine therefrom.

The pressure-resisting plate or disk $c$ is constructed to rest flatwise upon practically the entire portion of the diaphragm covering the oil-chamber $o$. The shank of the eye-bolt $e$ also extends freely upward through the nut member $f$ and plate $c$, and is attached to the latter by a cap-nut, $e^3$, or other analogous means. If desired, a small central screw, $s$, may be mounted in the member $b$ for limiting the amount of endwise play or upward movement of the disk $c$. In lieu of passing the weight-suspending bolt or member $e$ directly through the said elements $a$ and $c$, it may be provided with appropriately disposed arms, $e^2$, having the free ends $e^1$ thereof inwardly bent and rigidly secured to the upper side of the disk $c$, as represented in Fig. 3. In this case the bail member $b$ is secured to the outer edge of the companion member $a$ by bolts extending through feet $b^3$ into the base; the upper portion being provided with a central eye, $b^2$, adapted to receive a hook, as $i$, substantially as hereinbefore described.

Assuming now that the chamber $o$, as well as the passages and connections leading therefrom to a properly graduated gage, to be normally filled with oil or other suitable fluid and that the machine is suspended, say from the hook of a "fall" and tackle-block, the manner of using the improved weighing-machine A is very simple and obvious: The machine is first lowered to permit the object or article to be weighed to be conveniently hooked into or attached to the eye-bolt $e$, followed by manipulating the rope of the "fall" until the object is freely suspended from the machine, thereby causing the weight to be borne directly by the member $c$, which, pressing downward upon the diaphragm and the confined fluid relatively actuates an index or pointer of the graduated gage to indicate upon the dial or scale thereof the actual weight pressing upon the fluid (being the tension or pull upon the eye-bolt $e$); the pointer returning to the zero or normal position when the weight is removed from the machine.

It may be added that in my improved weighing apparatus the fluid pressure alone sustains the entire load being weighed; the load thus sustained is directly proportional to the fluid pressure. The fluid is retained by a very thin flexible diaphragm (say of soft brass or copper .005 of an inch thick) which offers no frictional resistance whatever to the perfect transfer of the load to the fluid, which alone sustains it. In all other devices of this class it has been usual, so far as I am aware, to so construct and arrange the parts that either friction or the stress induced by deforming an elastic diaphragm or other analogous member, one or both assist to sustain the load, thus making the latter not directly proportional to the fluid pressure.

I claim as my invention and desire to secure by United States Letters Patent:—

The combination in a portable hydrostatic weighing-machine, of a main frame or chambered casing consisting of upper and lower members detachably connected together and adapted to be suspended from a suitable surface, a substantially flat, thin, flexible metal diaphragm secured in said lower member and forming with the latter a shallow recess arranged to connect with a pressure-gage and also adapted to hold therein a practically non-compressible fluid, as water, a disk-like member located within said casing superimposed upon said diaphragm, and means secured to and depending from said disk-like member adapted when in use to have the article or object being weighed suspended therefrom.

In testimony whereof I have affixed my signature in presence of two witnesses.

WILLIAM H. KENERSON.

Witnesses:
GEO. H. REMINGTON,
CALVIN H. BROWN.